(12) United States Patent
Harada et al.

(10) Patent No.: US 9,196,895 B2
(45) Date of Patent: Nov. 24, 2015

(54) SEALED SECONDARY BATTERY (71) Applicants: TOYOTA JIDOSHA KABUSHIKI KAISHA, Toyota-shi, Aichi-ken (JP); SANYO Electric Co., Ltd., Moriguchi-shi, Osaka (JP)

(72) Inventors: Hironori Harada, Aichi-ken (JP); Hiroshi Inukai, Toyota (JP); Toshihiro Takada, Toyota (JP); Yasuhiro Yamauchi, Kasai (JP); Yoshinori Yokoyama, Kasai (JP)

(73) Assignees: Toyota Jidosha Kabushiki Kaisha, Toyota-shi, Aichi (JP); Sanyo Electric Co., Ltd., Osaka (JP)

( * ) Notice: Subject to any disclaimer, the term of this patent is extended or adjusted under 35 U.S.C. 154(b) by 295 days.

(21) Appl. No.: 13/749,995

(22) Filed: Jan. 25, 2013

(65) Prior Publication Data
US 2013/0196192 A1    Aug. 1, 2013

(30) Foreign Application Priority Data
Jan. 27, 2012    (JP) ................................. 2012-015980

(51) Int. Cl.
*H01M 2/34*    (2006.01)
*H01M 10/052*    (2010.01)

(52) U.S. Cl.
CPC ............ *H01M 2/345* (2013.01); *H01M 10/052* (2013.01); *Y02T 10/7011* (2013.01)

(58) Field of Classification Search
None
See application file for complete search history.

(56) References Cited

U.S. PATENT DOCUMENTS

| | | | |
|---|---|---|---|
| 6,242,126 B1 * | 6/2001 | Mori et al. | ...................... 429/53 |
| 6,753,104 B2 | 6/2004 | Kitoh | |
| 8,304,109 B2 | 11/2012 | Nansaka et al. | |
| 2010/0233529 A1 * | 9/2010 | Nansaka et al. | .............. 429/181 |

FOREIGN PATENT DOCUMENTS

| | | |
|---|---|---|
| JP | 11-345630 | 12/1999 |
| JP | 2004-253356 | 9/2004 |
| JP | 2010-212034 | 9/2010 |

* cited by examiner

*Primary Examiner* — Miriam Stagg
*Assistant Examiner* — Haroon S Sheikh
(74) *Attorney, Agent, or Firm* — Finnegan, Henderson, Farabow, Garrett & Dunner, LLP (57) ABSTRACT

Provided is a sealed secondary battery having a current interrupt mechanism with a high heat resistance that prevents fusion of the current collecting plate by the Joule heat generated during high-rate charge and discharged. A current interrupt mechanism 80 of a sealed secondary battery 10 provided in accordance with the present invention is configured such that when the internal pressure inside a battery case 12 rises above the predetermined level, a current interrupt valve 30 is deformed by the internal pressure in a direction of separating from a rectangular plate-shaped current collecting plate 72 and the current collecting plate breaks in the portion of an annular groove 79 of a central thin section 74 of the current collecting plate.

8 Claims, 6 Drawing Sheets

SEALED SECONDARY BATTERY

BACKGROUND OF THE INVENTION

1. Field of the Invention

The present invention relates to a sealed secondary battery (typically, a sealed secondary battery that as a whole has an angular shape (rectangular parallelepiped shape). More specifically, the present invention relates to a sealed secondary battery equipped with a current interrupt mechanism actuated by increase in internal pressure.

Note that this application claims priority under the Paris Convention based on Japanese Patent Application No. 2012-015980, filed on Jan. 27, 2012, the entire contents of which are incorporated into this application by reference.

2. Description of the Related Art

Secondary batteries such as lithium secondary batteries and nickel hydride batteries have been advantageously used in recent years as the so-called portable power sources for personal computers or portable terminals, or power sources for vehicles. In particular, lightweight lithium secondary batteries that make it possible to obtain a high energy density are expected to be advantageously used as high-output power sources for driving the vehicles such as electric automobiles and hybrid automobiles.

A battery of a sealed structure (sealed battery) in which an electrode body including a positive electrode and a negative electrode is sealed together with an electrolyte inside a battery case is a typical structural example of such secondary batteries. When a battery of such kind is charged, where a malfunction occurs due to the presence of a defective battery or a failure of a charging device, it can be assumed that an unusually high current will be supplied to the battery and the battery will get into an overcharged state. During such overcharging, battery reactions proceed at a high speed, gas is generated inside the sealed battery case, the internal pressure of the battery case rises, and the case can be deformed by the abnormal internal pressure (gas pressure). In order to resolve this problem, a battery structure has been suggested in the related art that includes a current interrupt mechanism such that a part thereof is deformed by the pressure inside the case (gas pressure) when an abnormality occurs in the battery, and the conductive portion is physically ruptured, thereby interrupting the electric current.

The conventional example relating to a secondary battery equipped with a current interrupt mechanism of such a configuration is disclosed in Japanese Patent Application Publication No. 2010-212034. The current interrupt mechanism disclosed in this publication includes a rectangular plate-shaped current collecting plate connected to an electrode body accommodated inside the case of an angular sealed secondary battery and an inversion plate (current interrupt valve) conductively welded to part of the current collecting plate. When the internal pressure of the case (gas pressure) rises, the inversion plate is inverted and deformed by the gas pressure in the direction of separating from the electrode body and current collecting plate, and part of the collector including the abovementioned welded portion breaks following this deformation. Current interruption is thus realized by such inversion, deformation and separation of the inversion plate from the collector main body.

In the current interrupt mechanism configured as described in Japanese Patent Application Publication No. 2010-212034, the welded portion of the current collecting plate and periphery thereof are formed to be thinner than other portions of the current collecting plate, and/or a groove (notch: cut-out portion) is formed in advance in a zone which is to be broken, so that the inversion plate (current interrupt valve) be inverted and deformed and that part of the collector including the above-mentioned welded portion be rapidly broken when this internal pressure of the case is reached, thereby ensuring that the electric current is reliably interrupted when the internal pressure of the case that has been set in advance (that is, a predetermined gas pressure) is reached.

Sealed secondary batteries used as drive power sources for vehicles such as electric automobiles and hybrid automobiles (including plug-in hybrid automobiles) are required to have a large capacity at a high output (typically a large capacity such that 1-hour-ratio capacity is equal to or greater than 3 Ah, for example, 5 to 20 Ah, or equal to or greater than 20 Ah (for example, 20 to 30 Ah) in order to demonstrate even better performance. Therefore, high-rate charge and discharge are required that are incomparable with that of the batteries used as power sources for personal computers or portable terminals (that is, for consumer applications).

SUMMARY OF THE INVENTION

However, where charge and discharge at a rate even higher than that of the conventional secondary batteries for drive power sources for vehicles are needed, it is necessary to construct a current interrupt mechanism that maintains a normal operation state and performs no unforeseen operations even when such high-rate charge and discharge are performed in a sealed secondary battery equipped with the current interrupt mechanism of the above-described configuration. For example, the portion with a thin section or a groove (notch) formed therein that is formed in a current collecting plate so that part of the current collecting plate is broken when the current interrupt valve (inversion plate) is rapidly inverted and deformed by the predetermined internal pressure (gas pressure) of the case, as described hereinabove, has a cross sectional area less than that of the surrounding relatively thick portion. In particular, where a groove is additionally provided in the thin portion, the cross sectional area of the grooved section is further reduced. When a large current flows in such a portion with a small cross sectional area during high-rate charge or discharge, this portion generates heat due to the generated Joule heat and when the generation of heat becomes excessive, the corresponding zone can be fused due to the overheating. Such fusion is undesirable because it causes current interruption.

The present invention has been created with the foregoing in view and it is an object thereof to provide a sealed secondary battery provided with a highly reliable current interrupt mechanism that prevents fusion of the current collecting plate by the Joule heat even during high-rate charge and discharge proceeding in batteries with increased output and realizes accurate current interruption when a predetermined internal pressure (gas pressure) of the case occurs.

The inventors have discovered that the above-described object can be realized by designing a current collecting plate that satisfies predetermined conditions in relation to the shape of the rectangular plate-shaped current collecting plate in the case where a current interrupt mechanism including the rectangular plate-shaped current collecting plate and a current interrupt valve is used.

Thus, the sealed secondary battery disclosed herein includes: an electrode body including a positive electrode and a negative electrode; a battery case accommodating the electrode body; a positive electrode terminal and a negative electrode terminal provided at an outer surface of the battery case and electrically connected to the positive electrode and negative electrode, respectively, of the electrode body; and a current interrupt mechanism that interrupts an electric current when an internal pressure inside the case rises above a predetermined level.

The current interrupt mechanism has, between the positive electrode of the electrode body and the positive electrode terminal or between the negative electrode of the electrode body and the negative electrode terminal, a current interrupt valve electrically connected to either of the positive terminal and negative terminal and a rectangular plate-shaped current collecting plate electrically connected to one of the positive electrode and the negative electrode of the electrode body.

The rectangular plate-shaped current collecting plate is constituted by a central thin section formed to be relatively thin and a thick portion formed to be relatively thick and located on the circumference of the central thin section, and an annular groove for breaking having a predetermined diameter is formed on the inner side of the central thin section.

Part of the current interrupt valve is conductively joined to the central thin section of the current collecting plate on the inner side of the annular groove, and the current interrupt valve is configured such that when the internal pressure inside the case rises above the predetermined level, the current interrupt valve is deformed by the internal pressure in a direction of separating from the current collecting plate, and the central thin section of the current collecting plate breaks in a portion of the annular groove, whereby the current interrupt valve following the break of the thin section is separated from the current collecting plate and current interrupt is realized.

It should be understood that the term "rectangular plate" described herein is not limited to the plate having four exact right-angle corners. The term "rectangular plate" described herein includes such as rectangular plates having one or more cutting shaped corner(s) formed by cutting the right-angle corner, or R(round)-shaped corner(s).

Further, in the sealed secondary battery disclosed herein, the rectangular plate-shaped current collecting plate is designed such that the following conditions are both fulfilled, where a cross section passing through a central point of the annular groove in the direction parallel to a short side of the rectangular plate-shaped current collecting plate is defined as a reference cross section:

(1) a cross section area A (mm$^2$) of the thick section in the reference cross section and a cross section B (mm$^2$) of the central thin section in the reference cross section satisfy the following relationship: a B/A value is equal to or greater than 0.05 and equal to or less than 0.15; and (2) a distance P (mm) between the thick section and the annular groove and a cross section area C (mm$^2$) of a remaining section in the annular groove satisfy the following relationship: a P/C value is equal to or less than 1.6.

The current interrupt mechanism provided in the sealed secondary battery disclosed herein is configured to include the rectangular plate-shaped current collecting plate and the current interrupt valve of the above-described configurations as the principal constituent elements, and the rectangular plate-shaped current collecting plate is designed such that the above-described condition (1) (that is, the cross section area A of the thick section in the reference cross section and the cross section B of the central thin section in the reference cross section satisfy the following relationship: a B/A value is equal to or greater than 0.05 and equal to or less than 0.15) and condition (2) (that is, the distance P between the thick section and the annular groove and the cross section area C of the remaining section in the annular groove satisfy the following relationship: a P/C value is equal to or less than 1.6) are both fulfilled.

In the sealed secondary battery of such a configuration, the current interrupt valve is rapidly deformed at a predetermined internal pressure (gas pressure) of the case, and part of the current collecting plate can be broken. At the same time, the Joule heat generated in a zone where the annular groove is formed can be efficiently dissipated toward the thick section when a large current, such as that during high-rate charge and discharge, flows therein. As a result, the resistance to fusion (heat resistance) is improved and this portion is unlikely to fuse. Therefore, it is possible to provide a sealed secondary battery (for example, a sealed lithium secondary battery) of higher quality in which reliability of the current interrupt mechanism is increased correspondingly to the requirements of high-rate charge and discharge needed for a transition to high output in batteries.

It is preferred that the B/A value be equal to or greater than 0.07 and equal to or less than 0.12 and that the P/C value be equal to or greater than 0.5 and equal to or less than 1.3.

Alternatively, it is also preferred that the cross sectional area C (mm$^2$) of the remaining portion in the annular groove be equal to or greater than 0.3 and that the distance P (mm) between the thick section and the annular groove be equal to or less than 0.5.

By ensuring the above-described numerical ranges with respect to the conditions (1) and (2), it is possible to improve further the resistance of the current interrupt mechanism to fusion (heat resistance).

In another preferred configuration of the sealed secondary battery disclosed herein, the diameter of the annular groove is equal to or greater than 4 mm (typically, equal to or greater than 4 mm and equal to or less than 6 mm).

Where the annular groove of such a diameter is provided, reliable actuation of the current interrupt valve (that is, the breakage of the current collecting plate) at a predetermined internal pressure (gas pressure) of the case and the increase in heat resistance can be both realized to a high degree.

Further, according to another preferred aspect of the sealed secondary battery disclosed herein, the thickness of the central thin section is equal to or less than 0.15 mm.

In accordance with the present invention, where the abovementioned conditions (1) and (2) are fulfilled, the Joule heat generated in a zone where the annular groove is formed can be efficiently dissipated toward the thick section when a large current, such as that during high-rate charge and discharge, flows therein. As a result, high resistance to fusion (heat resistance) can be realized even when the thickness of the central thin section is equal to or less than 0.15 mm.

Further, according to the present invention, as another preferred configuration of a battery in which the abovementioned conditions (1) and (2) are fulfilled and the reliable actuation of the current interrupt valve (that is, the breakage of the current collecting plate) at a predetermined internal pressure (gas pressure) of the case and the increase in heat resistance can be both realized to a high degree, so-called an angular lithium secondary battery or other sealed secondary batteries are exemplified in which the electrode body is a flat-shaped wound electrode body obtained by winding the elongated sheet-shaped positive electrode and the elongated sheet-shaped negative electrode together with an elongated sheet-shaped separator, and the battery case is formed in a flat angular shape corresponding to the shape of the wound electrode body and accommodating the wound electrode body.

The present invention also provides a battery pack which uses any of the sealed secondary batteries disclosed herein as a unit battery and in which a plurality of the unit batteries are electrically connected to each other.

The battery pack of such a configuration excels in resistance to fusion (heat resistance), while maintaining reliability of the current interrupt mechanisms of the unit cells constituting the pack. Therefore, such a battery pack can be advantageously used as a drive power source for vehicles such as an electric automobile and a hybrid automobile.

The present invention also provides a vehicle such as plug-in hybrid automobile (PHV), a hybrid automobile (HV), and an electric automobile (EV) that is provided with any of the sealed secondary batteries or battery packs disclosed herein as a drive power source.

DESCRIPTION OF THE PREFERRED EMBODIMENTS

In the present specification the term "lithium secondary battery" means a secondary battery which uses lithium ions as electrolyte ions and in which charge and discharge is realized by the transfer of electric charges by the lithium ions between the positive and negative electrodes. A secondary battery that is typically referred to as a lithium ion battery (or lithium ion secondary battery) is a representative example included in the scope of lithium secondary batteries referred to in the present specification. The "active material" as referred to in the present specification is a substance (compound) participating in storage of electricity at the positive electrode side or negative electrode side. Thus, it is a substance that participates in the processes of taking in and releasing electrons when the battery is charged and discharged.

One preferred embodiment relating to a lithium secondary battery (lithium ion battery) 10 will be described below with reference to the appended drawings as an example of the sealed secondary battery disclosed herein. A lithium ion battery of a form in which a wound-type electrode body (referred to hereinbelow as "wound electrode body") and a nonaqueous electrolytic solution are accommodated in an angular (that is, a rectangular parallelepiped box-shaped) case will be explained by way of example, but such a configuration is not intended to be limiting. The dimensional relationships (length, width, thickness, and the like) in the drawings do not reflect the actual dimensional relationships. Further, members and parts performing like action are denoted by like reference numerals and the redundant explanation thereof is herein omitted or simplified.

In the present invention, the type of the secondary battery is not limited to the lithium secondary battery (typically a lithium ion battery provided with a nonaqueous electrolyte) and the present invention can be also applied to a nickel hydride battery or other secondary battery, provided that the battery has the current interrupt mechanism of the configuration disclosed herein.

Figure 1:
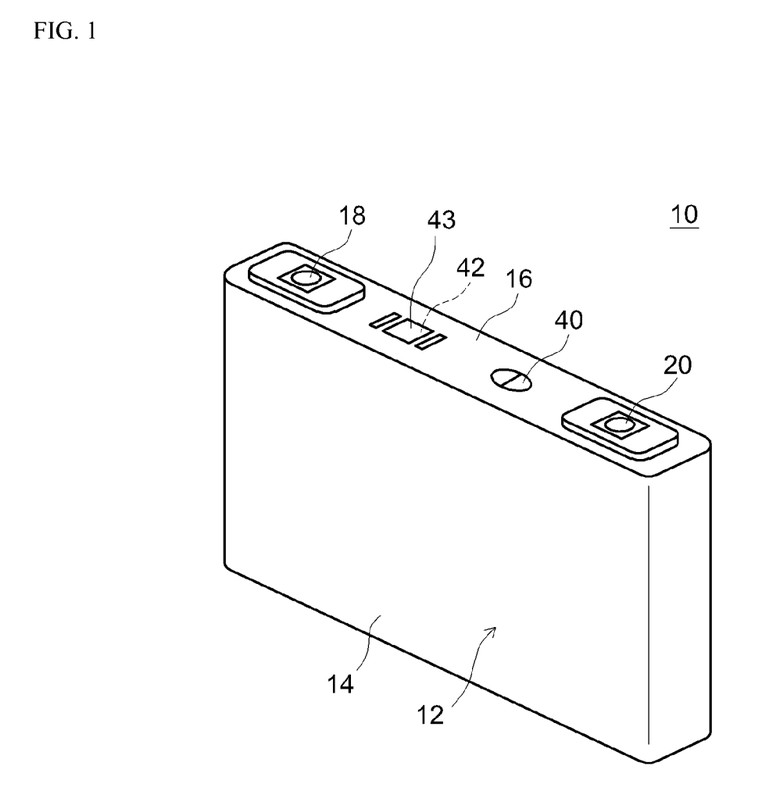
FIG. 1 is a perspective view illustrating schematically the outer shape of a sealed lithium ion secondary battery (lithium ion battery) according to an embodiment.
Figure 2:
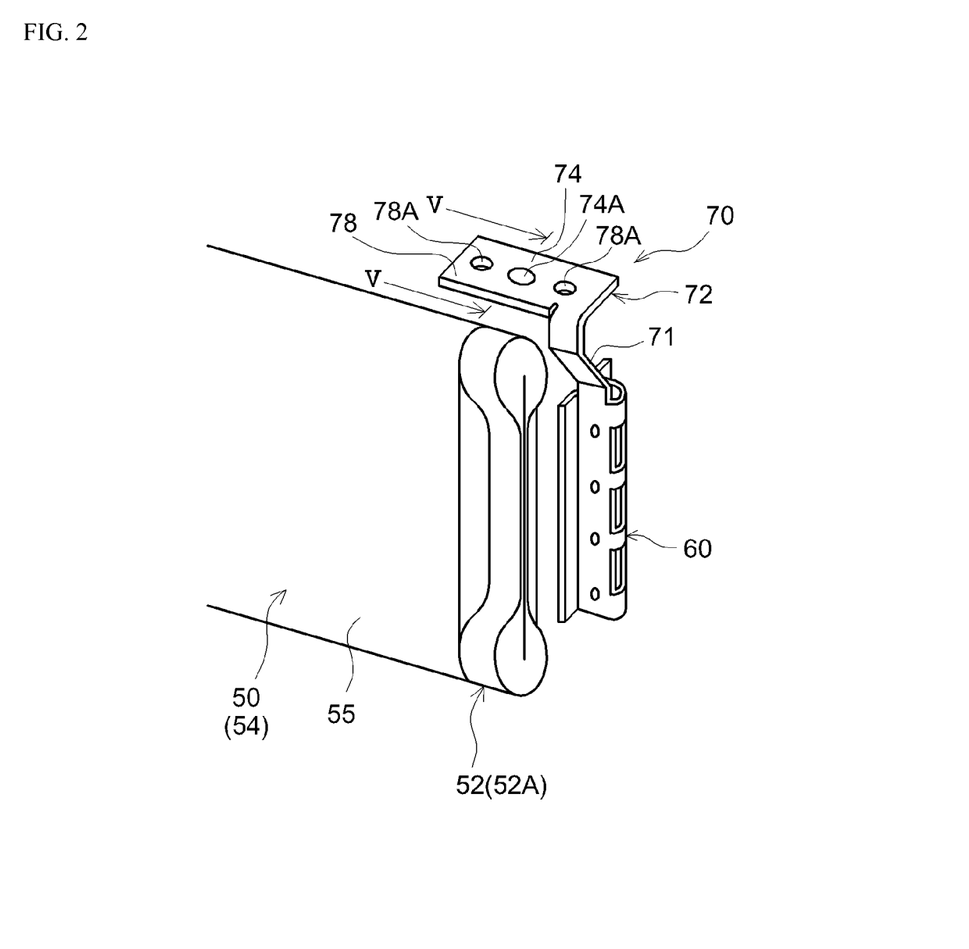
FIG. 2 illustrates schematically the structure of a collector in the sealed lithium ion secondary battery according to the embodiment.

A lithium ion battery 10 according to the present embodiment is configured by accommodating a flat-shaped wound electrode body 50, such as shown in FIG. 2, together with a liquid electrolyte (electrolytic solution), which is not shown in the figure, in a flat angular battery case (that is, an outer container) 12, such as shown in FIG. 1, that corresponds to the shape of the wound electrode body 50.

The battery case 12 is constituted by a box-shaped case main body 14 (that is, a rectangular parallelepiped with one open end) that has an opening at one end (corresponds to the upper end in the usual usage mode of the battery 10) and a sealing plate (lid) 16 constituted by a rectangular plate member that is attached to the opening and closes the opening. The battery case 12 of a sealed structure and a hexahedral shape constituted by a pair of wide case surfaces facing the wide surfaces of the flat-shaped wound electrode body 50 and four rectangular case surfaces adjacent to the wide case surfaces (that is, one of the rectangular case surfaces, namely the upper surface, is constituted by the sealing plate 16) is configured by welding the sealing plate (lid) 16 to the circumferential edge of the opening of the case main body 14.

The following dimensions can be presented as the preferred, but not particularly limiting, dimensions of the hexahedral case of the angular battery of this kind: the length of the long side of the case main body 14 and the sealing plate 16: about 80 to 200 mm (for example, 100 to 150 mm), the length of the short side of the case main body 14 and the sealing plate 16 (that is, thickness of the case 12): about 8 to 25 mm (for example, 10 to 20 mm), and the height of the case 12: about 70 to 150 mm.

The material of the case 12 is not particularly limited and may be same as that used in the conventional sealed batteries. The case 12 configured mainly from a lightweight metal material having good thermal conductivity is preferred, and examples of such metal materials include aluminum, stainless steel, and nickel-plated steel. The case 12 (case main body 14 and sealing plate 16) of the present embodiment is constituted by aluminum or an alloy based on aluminum.

The thickness of the case 12 (case main body 14 and sealing plate 16) is not particularly limited, but when a sealed battery for a vehicular drive source is to be configured, the appropriate thickness is about 0.3 mm to 2 mm, and the preferred thickness is about 0.5 mm to 1 mm.

As shown in FIG. 1, a positive electrode terminal 20 and a negative electrode terminal 18 for external connection are formed at the sealing plate 16. Terminal plates or outer connection terminals of appropriate shape corresponding to the usage mode of the lithium ion battery 10 of the present embodiment can be attached to those outer terminals 18, 20.

A thin safety valve 40 configured to release the internal pressure when the internal pressure of the case 12 rises to become equal to or higher than a predetermined level (for example, a preset valve opening pressure of about 0.3 to 1.0 MPa) and a liquid pouring port 42 (FIG. 1 shows a state in which the liquid pouring port 42 is sealed with the sealing material 43 and masked after the liquid has been poured) are formed between the terminals 18, 20 of the sealing plate 16.

As shown in FIG. 2, the wound electrode body 50 is fabricated similarly to the wound electrode body of the usual lithium ion battery by using an elongated sheet-shaped positive electrode (positive electrode sheet) 52 and an elongated sheet-shaped negative electrode (negative electrode sheet) (not shown in the figure) similar to the positive electrode sheet 52, laminating the electrode sheets together with two elongated sheet-shaped separators (separator sheets) 54, winding the laminate in the longitudinal direction, and then collapsing the obtained wound body by pressing from the side surface direction. More specifically, the positive electrode sheet 52 and the negative electrode sheet are wound in a state in which the two sheets are laminated so that the positions thereof are somewhat displaced in the width direction and that one end, in the width direction, of either of the positive and negative sheets protrudes from one end and the other end, in the width direction, of the separator sheet 54. As a result, at one end section and the other end section, in the winding axis direction, of the wound electrode body 50, portions are formed in which one end, in the width direction, of the positive electrode sheet 52 and the negative electrode sheet, respectively, protrudes outward from the winding core section 55 (that is, the portion where the positive electrode sheet, negative electrode sheet, and separator sheet are tightly wound).

A protruding portion 52A of the positive electrode sheet 52 is shown in FIG. 2. The positive electrode terminal 20 for external connection is electrically connected by the positive electrode current collecting tab 60 and a positive electrode collector 70 disposed inside the case 12 to the protruding portion 52A of the positive electrode sheet 52. Likewise, on the negative electrode side (not shown in the figure) the negative terminal 18 for external connection is electrically connected by a negative electrode current collecting tab and a negative electrode collector (not shown in the figure) that are disposed inside the case 12 to the protruding portion of the negative electrode sheet.

In the lithium ion battery 10 according to the present embodiment, a current interrupt mechanism 80 is constituted by part of the positive electrode terminal 20 and part of the positive electrode collector 70. The current interrupt mechanism 80 will be described below.

Materials and members constituting the wound electrode body 50 may be same as those of the collector bodies provided in the conventional lithium ion batteries and are not particularly limited. For example, the positive electrode sheet 52 can be configured by forming a positive electrode active material layer on an elongated positive electrode collector (for example, an aluminum foil). One or two or more substances that are used in the conventional lithium ion batteries can be used without any particular limitation as the positive electrode active material for forming the positive electrode active material layer. The preferred examples of such substances include oxides (lithium transition metal oxides) including lithium and a transmission metal element as constituent metal elements, such as lithium nickel oxide (for example, $LiNiO_2$), lithium cobalt oxide (for example, $LiCoO_2$), and lithium manganese oxide (for example, $LiMn_2O_4$), and phosphates including lithium and a transmission metal element as constituent metal elements, such as lithium manganese phosphate ($LiMnPO_4$) and lithium ion phosphate ($LiFePO_4$).

The negative electrode sheet can be configured by forming a negative electrode active material layer on an elongated negative electrode collector (for example, a copper foil). One or two or more substances that are used in the conventional lithium ion batteries can be used without any particular limitation as the negative electrode active material for forming the negative electrode active material layer. The preferred examples of such substances include carbon-containing materials such graphite carbon and amorphous carbon, lithium transition metal oxides, and lithium transition metal nitrides. The preferred examples of the separator sheet include sheets constituted by porous polyolefin resins.

Electrolytes similar to the nonaqueous electrolytic solution that are used in the conventional lithium ion batteries can be used without any particular limitations as the liquid electrolyte (electrolytic solution). Such nonaqueous electrolytic solutions typically have a composition in which a support salt is added to an appropriate nonaqueous solvent. Examples of the nonaqueous solvent include one or two or more solvents selected from the group consisting of ethylene carbonate, propylene carbonate, dimethyl carbonate, diethyl carbonate, ethyl methyl carbonate, 1,2-dimethoxyethane, 1,2-diethoxyethane, tetrahydrofuran, and 1,3-dioxolan. For example, a lithium salt such as $LiPF_6$, $LiBF_4$, $LiAsF_6$, $LiCF_3SO_3$, $LiC_4F_9SO_3$, $LiN(CF_3SO_2)_2$, and $LiC(CS_3SO_2)_3$ can be used as the abovementioned support salt. For example, a nonaqueous electrolytic solution can be used that is prepared by including $LiPF_6$ to a concentration of about 1 mol/L to a mixed solvent (for example, with a mass ratio of ethylene carbonate and diethyl carbonate of 1:1). A solid or gelled electrolyte may be used instead of the electrolytic solution.

The current interrupt mechanism 80 will be explained below in greater detail with reference to the appended drawings. First, the internal configuration of the positive electrode terminal 20 will be explained.

As shown in FIG. 2, the positive electrode current collecting tab 60 made from aluminum or an aluminum-based alloy is connected to the protruding portion 52A of the positive electrode that protrudes at one end, in the winding axis direction, of the wound electrode body 50. A positive electrode collector 70 made from aluminum or an aluminum-based alloy is formed so as to extend upward from this current collecting tab 60 (that is, in the sealing plate direction). The positive electrode collector 70 is constituted by a collector main body, that is, a current collecting plate 72 of a rectangular plate shape (typically, elongated plate shape) that is disposed close to the inner surface side of the sealing plate 16 substantially parallel to this inner surface, and an arm-shaped connection section 71 that connects the current collecting plate 72 with the positive electrode current collecting tab 60.

The current collecting plate 72 is constituted by a central thin section 74 that is welded to part (central recess 30A) of the below-described current interrupt valve (inversion plate) 30 and a relatively thick section 78 located on the outer circumference of the central thin portion. The central thin section is typically formed in a round or rectangular shape. Further, as shown in FIG. 2, gas flow holes 74A, 78A are formed in the central section of the central thin section 74 and in a plurality of locations (two locations in the present embodiment) of the thick section 78. An annular groove (notch) 79 for breaking is formed with a predetermined diameter on the inner side of the central thin section 74.

When the battery is to be used for a drive power source of a vehicle, the length (short diameter) of the short side of the rectangular plate-shaped current collecting plate 72 is typically about 6 mm to 15 mm, and the length (long diameter) of the long side of the current collecting plate 72 is typically set to be about 2 to 5 times the short diameter, but such dimensions are not particularly limiting.

Further, the thickness of the thick section 78 is typically equal to or less than 2 mm (for example, 0.4 mm to 2 mm), preferably equal to or less than 1 mm (for example, 0.5 mm to 1 mm). The thickness of the central thin section 74 is typically equal to or less than 0.2 mm (for example, 0.05 mm to 0.2 mm), preferably equal to or less than 0.15 mm (for example, 0.08 mm to 0.15 mm).

The size of the central thin section 74 is not particularly limited, and this section can be appropriately formed in a square or round shape with a diameter equal to a length corresponding to 40 to 70% of the length of the short diameter side of the current collecting plate 72 (for example, where the short diameter of the current collecting plate 72 is 8 mm, the diameter of the central thin section is 3.2 mm to 5.6 mm).

The diameter of the annular groove 79 is preferably equal to or greater than 4 mm (typically from 4 mm to 6 mm). Further, from the standpoint of increasing the resistance to fusion (heat resistance), the appropriate formation position of the annular groove 79 is such that the distance P between the thick section 78 and the annular groove 79 is equal to or less than 0.5 mm, and the preferred formation position is such that this distance is 0.2 to 0.4 mm (for example, about 0.3 mm±0.05 mm).

Concerning the notched depth of the annular groove 79, the appropriate thickness of the remaining section in the annular groove 79 is at least about 0.025 mm and the preferred thickness is equal to or greater than 0.03 mm (for example, about 0.03 mm to 0.08 mm). Where the thickness of the remaining section is too small, the resistance to fusion becomes undesirably too low. Conversely, where the thickness of the remaining section is too large, the current collecting plate is difficult to break when a predetermined pressure inside the case is generated, which is also undesirable.

Figure 5:
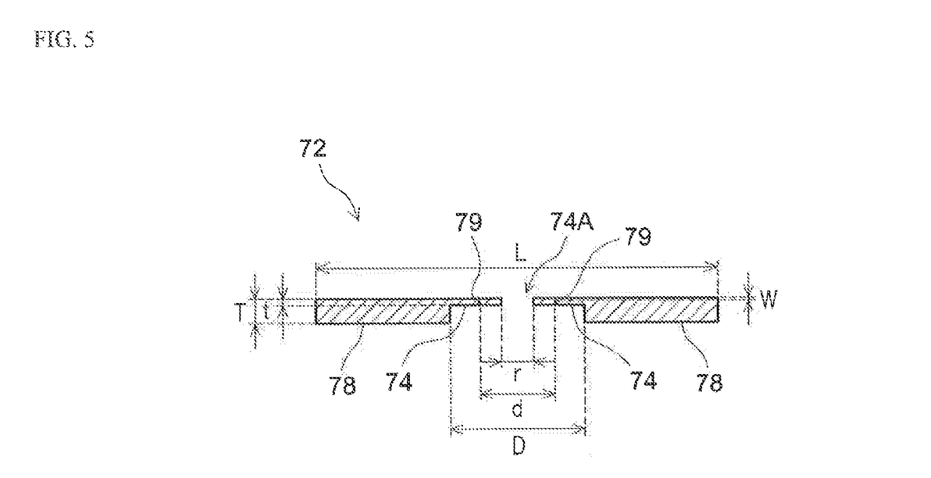
FIG. 5 shows a cross section taken along the V-V line in FIG. 2 which is a reference cross section of the rectangular plate-shaped current collecting plate provided in the current interrupt mechanism of the sealed lithium ion secondary battery according to the embodiment.

As described hereinabove, when the present invention is implemented, the rectangular plate-shaped current collecting plate 72 is designed such that the two following conditions (1) and (2) are fulfilled, where a cross section passing through a central point of the annular groove 79 in the direction parallel to the short side of the current collecting plate 72 is taken as a reference cross section, as shown in FIG. 5:

(1) the cross section area A (mm$^2$) of the thick section 78 in the reference cross section and the cross section B (mm$^2$) of the central thin section 74 in the reference cross section satisfy the following relationship: the B/A value is equal to or greater than 0.05 and equal to or less than 0.15 (preferably the B/A value is equal to or greater than 0.07 and equal to or less than 0.12); and (2) the abovementioned distance P (mm) between the thick section and the annular groove and the cross section area C (mm$^2$) of the remaining section in the annular groove satisfy the following relationship: the P/C value is equal to or less than 1.6 (preferably, the P/C value is equal to or greater than 0.5 and equal to or less than 1.3).

It is even more preferred that the cross section area C (mm$^2$) of the remaining section in the annular groove 79 be equal to or greater than 0.3 mm. Further, it is particularly preferred that the distance P (mm) between the thick section 78 and the annular groove 79 be equal to or less than 0.5 (see the below-described examples).

Figure 3:
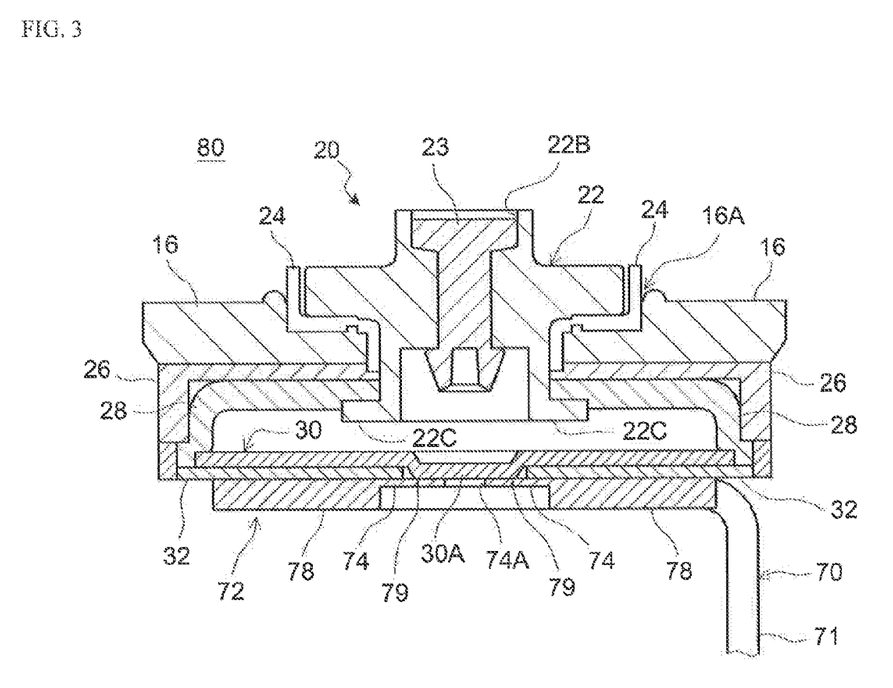
FIG. 3 is a cross-sectional view illustrating schematically the configuration and state (before current interruption) of a current interrupt mechanism provided at the positive electrode side of the sealed lithium ion secondary battery according to the embodiment.

Meanwhile, as shown in FIG. 3, the positive electrode terminal 20 according to the present embodiment is provided, at the outer surface side of the sealing plate 16, with a tubular connection terminal 22 attached to a positive electrode attachment hole 16A, which has been formed in advance in the sealing plate 16, and a gasket 24 interposed between the tubular connection terminal 22 and the sealing plate 16 (circumferential edge of the attachment hole 16A). A rubber terminal plug 23 is inserted into the through hole 22B of the tubular connection terminal 22.

Further, the positive electrode terminal 20 according to the present embodiment is also provided, on the inner surface side of the sealing plate 16, with a rectangular cap-shaped synthetic resin insulating plate 26 and a metallic sealing body tab 28 having formed therein respective insertion holes into which the aforementioned tubular connection terminal 22 can be inserted.

More specifically, as shown in FIG. 3, the tubular connection terminal 22 electrically connected to the positive electrode collector 70 is inserted into holes formed in the gasket 24, sealing plate 16, insulating plate 26, and sealing body tab 28, and a distal end section 22C of the tubular connection terminal is caulked as shown in the figure, whereby those members 22, 24, 16, 26, and 28 are integrally fixed.

Further, the rectangular plate-shaped inversion plate 30 functioning as a current interrupt valve is welded to the edge section of the rectangular cap-shaped sealing body tab 28, and an insulating holder 32 made from a synthetic resin is disposed in the circumferential section of the collector main body 72 and the inversion plate 30 with the object of positioning the collector 72 and the inversion plate 30 and ensuring electric insulation in the peripheral section.

The central section of the rectangular plate-shaped inversion plate 30 is recessed so as to be in contact with the central thin section 74 of the current collecting plate 72 through a hole formed in the central section of the corresponding insulating holder 32, and such a central recess 30A of the inversion plate 30 is joined by laser welding or ultrasonic welding to the inner side of the annular groove 79 of the central thin section 74 of the current collecting plate 72. In other words, the annular groove 79 for breaking is present on the periphery of the joining zone of the central recess 30A of the inversion plate 30 in the central thin section 74 of the current collecting plate 72 of the positive electrode collector 70.

Because of the above-described configuration, the positive electrode sheet 52 is electrically connected to the connection terminal 22 by the positive electrode protruding portion 52A, current collecting tab 60, collector 70, inversion plate 30, and sealing body tab 28.

Figure 4:
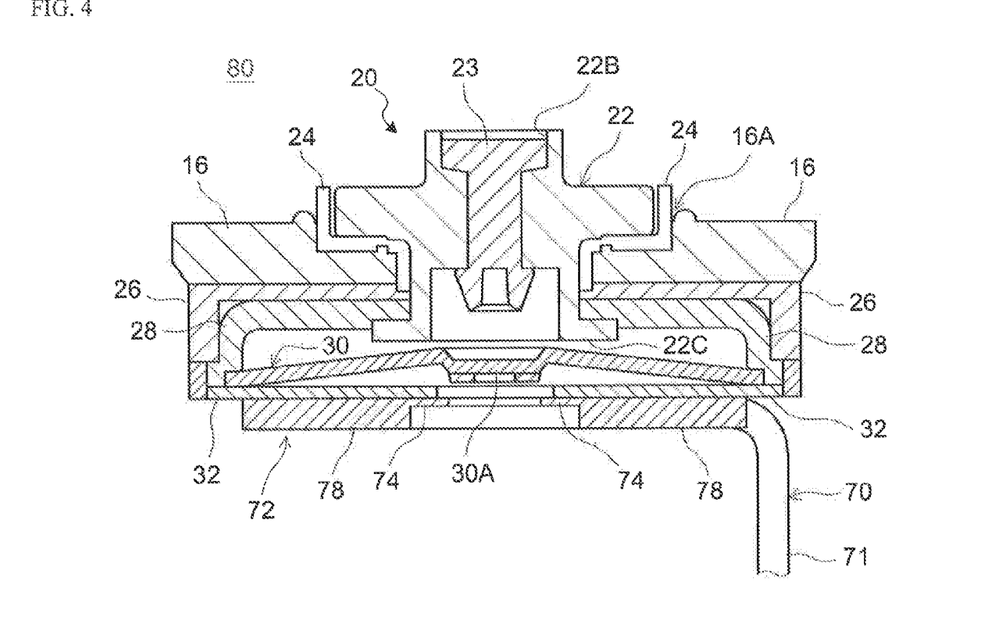
FIG. 4 is a cross-sectional view illustrating schematically the configuration and state (after current interruption) of a current interrupt mechanism provided at the positive electrode side of the sealed lithium ion secondary battery according to the embodiment.

The inversion plate 30 is formed such as to be deflected and deformed to the connection terminal 22 side (typically inverted and deformed to the connection terminal 22 side) when the pressure (gas pressure) inside the battery case 12 increases to or above the predetermined value. Furthermore, the current collecting plate 72 is welded to the central recess 30A of the inversion plate 30. Therefore, when the pressure inside the case 12 exceeds the predetermined value and the inversion plate 30 is deformed as described hereinabove, the thin section 74 of the current collecting plate 72 is broken, following this deformation, in a portion of the annular groove 79. As a result, as shown in FIG. 4, the electric connection between the inversion plate 30 and the current collecting plate 72 is interrupted. The current interrupt mechanism 80 according to the present embodiment is provided at the positive electrode terminal 70 side, but such a configuration is not limiting, and the current interrupt mechanism may be also provided on the negative electrode terminal 72 side.

Several specific examples of tests relating to the current collecting plate provided in accordance with the present invention are described below, but the current collecting plate provided in accordance with the present invention is not intended to be limited to the below-described examples.

<Test Example: Evaluation of Heat Resistance of Current Collecting Plates of Various Sizes and Shapes (Samples 0 to 7)>

Rectangular plate-shaped aluminum current collecting plates 72 of seven types (Samples 0, 1, 2, 3, 4, 5, and 6) for which the sizes and cross sectional areas relating to the current collecting plate 72, which are shown with respect to the reference cross section in FIG. 5, are shown in Table 1 below were fabricated. The long-diameter size of the current collecting plate of each sample was 2.5 times the short-diameter size. Meanwhile, the inversion plate 30 of a rectangular shape 8 mm (short diameter)×20 mm (long diameter), such as shown in the aforementioned FIG. 3 and a thickness of about 0.3 mm to 0.5 mm was prepared.

The central recess 30A of the inversion plate 30 was laser welded to the circumferential edge of the gas flow hole 74A, which was the central section of the central thin section 74, at a location on the inner side of the annular groove 79.

The resistance to fusion (heat resistance) was evaluated by using a joined body of the current collecting plate and inversion plate of each sample. More specifically, a high-capacity current (in this case 1500 A) was passed between the current collecting plate and inversion plate in the joined body of each sample and the time (sec) till a portion of the annular groove was fused by the Joule heat generated by such current was measured. The results are shown in the appropriate columns in Table 1.

equal to or greater than 0.5 and equal to or less than 1.3), the time to fusion is extended by comparison with that of Sample 0 in which the condition (2) is not fulfilled. In particular, in the collectors of Samples 2, 3, 4, and 5, the time to fusion is extended by a factor equal to or greater than 6, although the outer shape (short diameter and long diameter) are substantially equal to those of Sample 0.

As described hereinabove, in accordance with the present invention, it is possible to provide a sealed secondary battery (typically a lithium secondary battery or other sealed secondary battery with an angular outer shape) equipped with a current interrupt mechanism using a current collecting plate that satisfies the conditions (1) and (2) disclosed herein. Since such a collector excels in resistance to fusion (heat resistance), the battery is advantageous as a drive power source for a vehicle that requires high-rate charge and discharge resulting from the increased output. Therefore, the present invention also provides a battery pack 100 such as shown schematically in FIG. 6.

Figure 6:
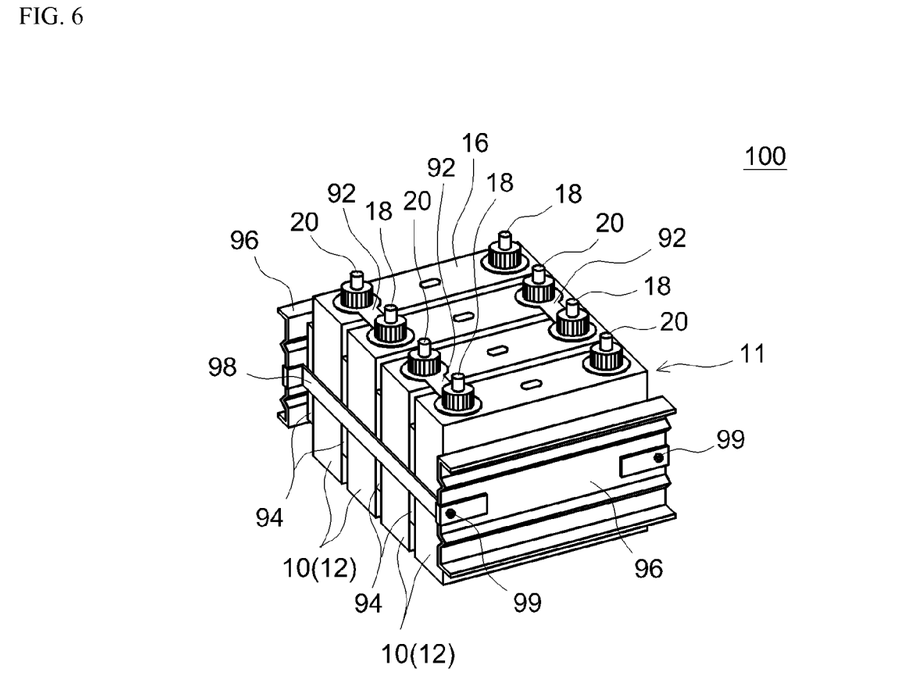
FIG. 6 is a perspective view illustrating the configuration of the battery pack according to the embodiment.

More specifically, as shown in FIG. 6, the sealed secondary battery (typically, an angular lithium secondary battery such as shown in the FIG. 10 equipped with a current interrupt mechanism (see the above-described FIGS. 2 to 4) constructed by using the current collecting plate disclosed herein is used as a single cell and a plurality of single cells 10 (in the embodiment shown in the figure, four unit cells, but this number is not limiting) is arranged in a predetermined direc-

TABLE 1

|  |  |  | Sample 0 | Sample 1 | Sample 2 | Sample 3 | Sample 4 | Sample 5 | Sample 6 |
|---|---|---|---|---|---|---|---|---|---|
| L |  | Short diameter of current collecting plate (mm) | 8 | 8 | 8 | 8 | 8 | 8 | 11 |
| d |  | Diameter of annular groove (mm) | 3.6 | 4 | 4 | 4 | 4 | 4 | 4.6 |
| D |  | Diameter of central thin section (mm) | 4.6 | 4.6 | 4.6 | 4.6 | 5 | 5 | 5.6 |
| r |  | Diameter of gas flow hole (mm) | 2 | 2 | 2 | 2.3 | 2.45 | 2.45 | 3 |
| t |  | Thickness of central thin section (mm) | 0.11 | 0.11 | 0.11 | 0.11 | 0.11 | 0.11 | 0.11 |
| T |  | Thickness of thick section (mm) | 0.8 | 0.8 | 0.8 | 0.8 | 0.8 | 0.8 | 0.8 |
| w |  | Thickness of remaining section of annular groove (mm) | 0.025 | 0.025 | 0.04 | 0.04 | 0.025 | 0.032 | 0.065 |
| Circumferential length of annular groove |  | mm | 11.31 | 12.57 | 12.57 | 12.57 | 12.57 | 12.57 | 14.45 |
| Cross sectional area of annular groove: C |  | $mm^2$ | 0.28 | 0.31 | 0.50 | 0.50 | 0.31 | 0.40 | 0.94 |
| Cross sectional area of thick section (A) |  | $mm^2$ | 2.72 | 2.72 | 2.72 | 2.72 | 2.40 | 2.40 | 4.32 |
| Cross sectional area of central thin section (B) |  | $mm^2$ | 0.29 | 0.29 | 0.29 | 0.25 | 0.28 | 0.28 | 0.29 |
| B/A (cross sectional area ratio) |  | — | 0.11 | 0.11 | 0.11 | 0.09 | 0.12 | 0.12 | 0.07 |
| Distance between thick section and annular groove: P |  | (D − d)/2 | 0.50 | 0.30 | 0.30 | 0.30 | 0.50 | 0.50 | 0.50 |
| P/C |  |  | 1.77 | 0.95 | 0.60 | 0.60 | 1.59 | 1.24 | 0.53 |
| Fusion time during conduction at 1500 A |  | sec | 0.01 | 0.04 | 0.10 | 0.07 | 0.06 | 0.08 | 0.92 |

As shown in Table 1, it is confirmed that with the Samples 1 to 6 for which the above-described conditions are both fulfilled, that is, (1) the cross section area A ($mm^2$) of the thick section in the reference cross section and the cross section B ($mm^2$) of the central thin section in the reference cross section satisfy the following relationship: a B/A value is equal to or greater than 0.05 and equal to or less than 0.15; and (2) the distance P (mm) between the thick section and the annular groove and a cross section area C ($mm^2$) of a remaining section in the annular groove satisfy the following relationship: a P/C value is equal to or less than 1.6 (in particular, tion. The pack is typically configured by connecting the unit cells 10 in series as shown in the figure. More specifically, the positive electrode terminal 20 that is to be electrically connected with the positive electrode and the negative electrode terminal 18 that is to be electrically connected with the negative electrode of the electrode body accommodated inside the case 12 are provided at the upper surface (that is, sealing plate) 16 of the battery case 12 of each unit cell 10. The positive electrode terminal 20 of one of the adjacent single cells 10 and the negative electrode terminal 18 of the other of the adjacent single cells are electrically connected by an appropriate connection tool 92. Further, the end plates 96 are disposed at the respective outer sides of the arranged unit cell group 11, and a fastening beam member 98 is attached along the arrangement direction to both side surfaces of the unit cell group 11, so as to span a pair of the end plates 96. The end sections of the beam member 98 can be fastened and fixed to the end plates 96 by screws 99. A battery pack 100 advantageous as a drive power source for a vehicle having the desired voltage is thus constructed by connecting the single cells 10 in series and then restraining (fixing) the unit cells.

Space holding sheets 94 of a predetermined shape are typically disposed between a plurality of such unit cells 10 arranged in a predetermined direction. The space holding sheets 94 are preferably formed in a shape or formed from a material (for example, a metal material with good thermal conductivity or lightweight and hard polypropylene or other synthetic resins) such that the sheets can function as heat radiating members for dissipating the heat generated inside the unit cells 10 when the cells are used.

Figure 7:
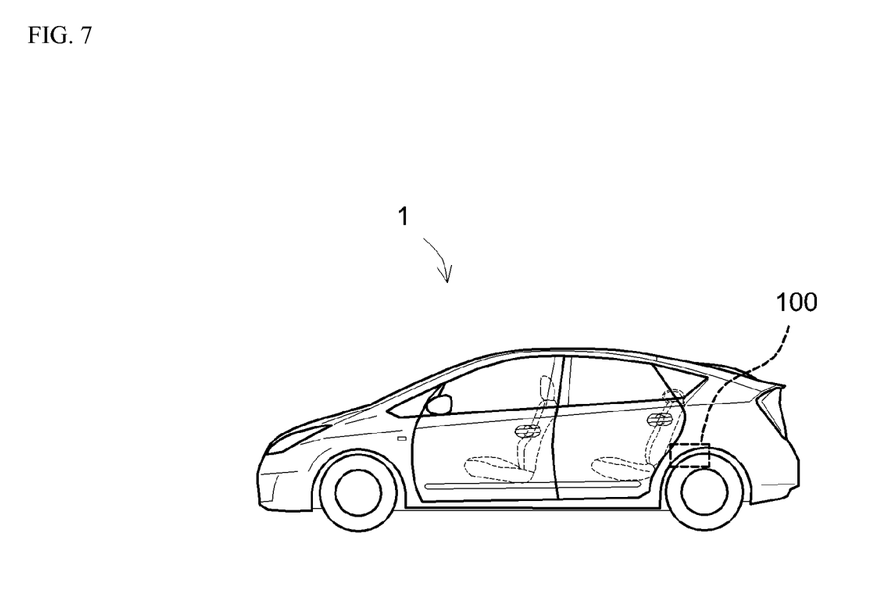
FIG. 7 is a side view illustrating schematically a vehicle (automobile) provided with the battery pack according to the embodiment.

The present invention can also provide, as shown in FIG. 7, the vehicle 1 (typically, an automobile equipped with a drive electric motor, such as an electric automobile, a hybrid automobile, a plug-in hybrid automobile, or a fuel cell automobile) equipped with a drive power source with the battery pack 100 using as a single cell a sealed secondary battery (typically, an angular sealed lithium secondary battery) of a large capacity at a high output (typically, a large capacity such that 1-hour-ratio capacity is equal to or greater than 3 Ah, for example, 5 to 20 Ah, or greater than 20 Ah (for example, 20 to 30 Ah) that is equipped with the current interrupt mechanism configured by using the current collecting plate disclosed herein.

Specific examples of the present invention are explained above, but those examples place no limitation on the claims. Thus, the features set forth in the claims also include various modifications and changes of the specific examples explained hereinabove.

What is claimed is:

1. A sealed secondary battery comprising:
   an electrode body including a positive electrode and a negative electrode;
   a battery case accommodating the electrode body;
   a positive electrode terminal and a negative electrode terminal provided at an outer surface of the battery case and electrically connected to the positive electrode and negative electrode, respectively, of the electrode body; and
   a current interrupt mechanism that interrupts an electric current when an internal pressure inside the case rises above a predetermined level, wherein
   the current interrupt mechanism has, between the positive electrode of the electrode body and the positive electrode terminal or between the negative electrode of the electrode body and the negative electrode terminal, a current interrupt valve electrically connected to either of the positive terminal and negative terminal and a rectangular plate-shaped current collecting plate electrically connected to either of the positive electrode and the negative electrode of the electrode body;
   the rectangular plate-shaped current collecting plate is constituted by a central thin section formed to be relatively thin and a thick portion formed to be relatively thick and located on the circumference of the central thin section, and an annular groove for breaking having a predetermined diameter is formed on the inner side of the central thin section;
   part of the current interrupt valve is conductively joined to the central thin section of the current collecting plate on the inner side of the annular groove; and
   the current interrupt valve is configured such that when the internal pressure inside the case rises above the predetermined level, the current interrupt valve is deformed by the internal pressure in a direction of separating from the current collecting plate, and the central thin section of the current collecting plate breaks in a portion of the annular groove, whereby the current interrupt valve following the break of the thin section is separated from the current collecting plate and current interrupt is realized,
   with the rectangular plate-shaped current collecting plate being designed such that the following conditions (1) and (2) are both fulfilled, where a cross section passing through a central point of the annular groove in the direction parallel to a short side of the rectangular plate-shaped current collecting plate is defined as a reference cross section:
   (1) a cross section area A (mm$^2$) of the thick section in the reference cross section and a cross section B (mm$^2$) of the central thin section in the reference cross section satisfy the following relationship; a B/A value is equal to or greater than 0.05 and equal to or less than 0.15; and
   (2) a distance P (mm) between the thick section and the annular groove and a cross section area C (mm$^2$) of a remaining section in the annular groove satisfy the following relationship: a P/C value is equal to or greater than 0.5 and equal to or less than 1.6, wherein the thickness of the remaining section in the annular groove is equal to or greater than 0.025 mm and equal to or less than 0.08 mm.

2. The sealed secondary battery according to claim 1, wherein the EVA value is equal to or greater than 0.07 and equal to or less than 0.12, and the P/C value is equal to or greater than 0.5 and equal to or less than 1.3.

3. The sealed secondary battery according to claim 1, wherein the cross section area C (mm$^2$) of the remaining section in the annular groove is equal to or greater than 0.3 mm$^2$, and the distance P (mm) between the thick section and the annular groove is equal to or less than 0.5.

4. The sealed secondary battery according to claim 1, wherein the diameter of the annular groove is equal to or greater than 4 mm.

5. The sealed secondary battery according to claim 1, wherein the thickness of the central thin section is equal to or less than 0.15 mm.

6. The sealed secondary battery according to claim 1, wherein
   the positive electrode is elongated and sheet-sampled and the negative electrode is elongated and sheet-shaped;
   the electrode body is a flat-shaped wound electrode body obtained by winding the elongated sheet-shaped positive electrode and the elongated sheet-shaped negative electrode together with an elongated sheet-shaped separator; and
   the battery case is formed in a flat angular shape corresponding to the shape of the wound electrode body and accommodating the wound electrode body.

7. A battery pack in which the sealed secondary battery according to claim 1 is used as a unit cell and a plurality of unit cells are electrically connected to each other.

8. A vehicle comprising the battery pack according to claim 7 as a drive power source.

* * * * *